United States Patent
DiMuro

(10) Patent No.: US 8,851,370 B2
(45) Date of Patent: Oct. 7, 2014

(54) SYSTEM AND METHOD FOR SECURE CARD WITH ON-BOARD VERIFICATION

(71) Applicant: JPMorgan Chase Bank, N.A., New York, NY (US)

(72) Inventor: Jeffrey D. DiMuro, Milford, CT (US)

(73) Assignee: JPMorgan Chase Bank, N.A., New York, NY (US)

(*) Notice: Subject to any disclaimer, the term of this patent is extended or adjusted under 35 U.S.C. 154(b) by 23 days.

(21) Appl. No.: 13/732,704

(22) Filed: Jan. 2, 2013

(65) Prior Publication Data

US 2014/0183258 A1    Jul. 3, 2014

(51) Int. Cl.
*G06K 5/00* (2006.01)
*G06Q 20/38* (2012.01)

(52) U.S. Cl.
CPC .................................. *G06Q 20/3821* (2013.01)
USPC ............................ 235/380; 235/487; 235/492

(58) Field of Classification Search
CPC .... G07F 7/1008; G06Q 20/341; G06Q 20/40; G06K 19/0723
USPC .......................................... 235/492, 487, 380
See application file for complete search history.

(56) References Cited

U.S. PATENT DOCUMENTS

| | | | | | |
|---|---|---|---|---|---|
| 5,590,038 | A | * | 12/1996 | Pitroda | 705/41 |
| 5,708,422 | A | * | 1/1998 | Blonder et al. | 340/5.41 |
| 5,914,472 | A | * | 6/1999 | Foladare et al. | 235/380 |
| 6,047,270 | A | * | 4/2000 | Joao et al. | 705/44 |
| 6,776,332 | B2 | * | 8/2004 | Allen et al. | 235/380 |
| 7,249,092 | B2 | * | 7/2007 | Dunn et al. | 705/38 |
| 7,597,250 | B2 | * | 10/2009 | Finn | 235/380 |
| 7,715,593 | B1 | * | 5/2010 | Adams et al. | 382/115 |
| 7,992,777 | B1 | | 8/2011 | Block | |
| 8,266,451 | B2 | * | 9/2012 | Leydier et al. | 713/193 |
| 8,393,535 | B1 | * | 3/2013 | Yee | 235/380 |
| 2004/0124246 | A1 | * | 7/2004 | Allen et al. | 235/492 |
| 2004/0133787 | A1 | * | 7/2004 | Doughty et al. | 713/186 |
| 2005/0040242 | A1 | * | 2/2005 | Beenau et al. | 235/492 |
| 2006/0161789 | A1 | * | 7/2006 | Doughty et al. | 713/186 |
| 2006/0202025 | A1 | * | 9/2006 | Calabrese et al. | 235/380 |
| 2007/0078783 | A1 | | 4/2007 | Shatford | |
| 2008/0056544 | A1 | * | 3/2008 | Aikawa et al. | 382/124 |
| 2008/0169350 | A1 | * | 7/2008 | Audebert et al. | 235/492 |
| 2008/0201265 | A1 | * | 8/2008 | Hewton | 705/67 |
| 2009/0184167 | A1 | * | 7/2009 | Faith et al. | 235/492 |
| 2010/0250435 | A1 | * | 9/2010 | Pedersen et al. | 705/44 |

(Continued)

OTHER PUBLICATIONS

International Search Report PCT/US2013/076554 dated May 6, 2014.

(Continued)

*Primary Examiner* — Paultep Savusdiphol
(74) *Attorney, Agent, or Firm* — Hunton & Williams LLP

(57) ABSTRACT

Systems and methods for secure cards with on-board verification are disclosed. In one embodiment, a transaction device associated with at least one transaction account may have a substrate comprising a display that displays an account identifier for the transaction account; a sensor that receives authentication information from a user; a processor that processes the authentication information to verify the authenticity of the user; and a communicator that communicates at least the account information, the communicator including at least one of a magnetic stripe, an electrical interface, and a wireless RF interface. The display may not display the account identifier until the user is authenticated, and the communicator may be inactive to communicate the account information until the user is authenticated.

10 Claims, 3 Drawing Sheets

(56) References Cited

U.S. PATENT DOCUMENTS

| | | | |
|---|---|---|---|
| 2011/0035240 A1* | 2/2011 | Joao | 705/4 |
| 2011/0140841 A1* | 6/2011 | Bona et al. | 340/5.83 |
| 2011/0147461 A1 | 6/2011 | Chen | |
| 2011/0320345 A1* | 12/2011 | Taveau et al. | 705/39 |
| 2012/0078751 A1 | 3/2012 | Macphail et al. | |
| 2012/0144461 A1 | 6/2012 | Rathburn | |
| 2012/0272307 A1* | 10/2012 | Buer | 726/9 |
| 2013/0075475 A1* | 3/2013 | Hart et al. | 235/492 |

OTHER PUBLICATIONS

Written Opinion of the International Searching Authority in PCT/US2013/076554 dated May 6, 2014.

* cited by examiner

SYSTEM AND METHOD FOR SECURE CARD WITH ON-BOARD VERIFICATION

BACKGROUND OF THE INVENTION

1. Field of the Invention

The present invention generally relates to the secure transaction cards having on-board verification.

2. Description of the Related Art

Magnetic stripe cards, such as commercial credit cards, debit cards, or transfer funds cards are widely used for payments, cash advances, or other financial transactions. Data for identifying the customer, such as an account number, a security code, or other identifying data is typically magnetically stored on a magnetic tape or strip embedded into the back side of the card.

When a transaction is to be performed at a retail store, a customer hands his or her card to an employee of the retail store and the employee then scans the magnetic information into a communication device.

Smart cards are cards that include a processor coupled to an electrically erasable, programmable, read-only memory (EEPROM), read-only memory (ROM) and random access memory (RAM). These components may be fabricated onto a single integrated chip comprising a microprocessing/controller unit (MPU). The processor executes instructions stored on ROM and temporarily stores data on RAM whereas the EEPROM is a non-volatile memory used for storing data identifying the uniqueness of a smart card. A smart card also may include an input/output (I/O) signal interface for transferring various I/O signals between the smart card and an external system. The I/O interface may take the form of a contact with the external system, or a peripheral thereof, for proper transfer of signals. Alternatively, the I/O interface may take the form of a radio frequency (RF) interface for allowing communication between the smart card and the external system via the transmission and reception of RF signals. The external system may take the form, for example, of a card reader, a merchant's point of sale system, or an automated teller machine.

Typically, power is supplied to the smart card from the external system when the system communicates with the smart card. This may be accomplished through the I/O interface. However, this means that a smart card is only powered and its data is accessible only when the smart card is connected to the external system.

One of the widespread uses of smart card technology is as a stored-value card, which contains monetary value in the microchip embedded in the card. For example, each time a consumer uses a chip card in a vending machine, the amount of the purchase is deducted from the cash balance stored in the microchip on the chip card. One application for such stored-value chip cards is eliminating the need for people to carry around small coins or bills and speed up the time it takes to consummate small cash transactions. However, most chip cards do not offer built-in displays for viewing the cash balance remaining on the chip card. This reduces the convenience and ease of use of chip cards.

SUMMARY OF THE INVENTION

Systems and methods for secure cards with on-board verification are disclosed. In one embodiment, a transaction device associated with at least one transaction account may have a substrate comprising a display that displays an account identifier for the transaction account; a sensor that receives authentication information from a user; a processor that processes the authentication information to verify the authenticity of the user; and a communicator that communicates at least the account information, the communicator including at least one of a magnetic stripe, an electrical interface, and a wireless RF interface. The display may not display the account identifier until the user is authenticated, and the communicator may be inactive to communicate the account information until the user is authenticated.

In one embodiment, the substrate may be clear or transparent. In one embodiment, the substrate may incorporate the display.

In one embodiment, the account identifier may comprise an account number.

In one embodiment, the transaction account may be a credit account, and the account identifier may comprise a credit account number.

In one embodiment, the authentication information may include a biometric from the user.

In one embodiment, the transaction device may further comprise an input for receiving data from the user.

A method of using a transaction card is disclosed. In one embodiment, the method may include (1) receiving, at a transaction card, authentication information from a user; (2) retrieving, from a memory, stored authentication information for the user; (3) a computer processor verifying the authenticity of the user by comparing the authentication information with the stored authentication information; and (4) after the user is verified: (a) displaying on a display an account identifier for a transaction account associated with the user; and (b) activating at least one of a magnetic stripe, an electrical interface, and a wireless RF interface to communicate the account information.

In one embodiment, the account identifier may comprise an account number.

In one embodiment, the account identifier maybe a credit account, and the account identifier may comprise a credit account number.

In one embodiment, the authentication information may comprise a biometric from the user.

In one embodiment, the method may further include receiving, from a point of sale device, transaction data; the computer processor determining if additional user authentication is necessary; if additional authentication information is necessary, and before the account identifier is displayed on the display and the at least one of a magnetic stripe, an electrical interface, and a wireless RF interface is activated: displaying on the display a request for second authentication information from the user; receiving the second authentication information from the user; the computer processor verifying the second authentication information.

In one embodiment, the method may further include receiving, from a point of sale device, transaction data; communicating, to an approval authority, the transaction data; receiving, from the approval authority, a requirement for additional authentication; displaying on the display a request for second authentication information from the user; receiving the second authentication information from the user; and the computer processor verifying the second authentication information.

A method of using a transaction card is disclosed. In one embodiment, the method may include (1) receiving, at a transaction card, authentication information from a user; (2) retrieving, from a memory, stored authentication information for the user; (3) a computer processor verifying the authenticity of the user by comparing the authentication information with the stored authentication information; and (4) after the user is verified: (a) displaying on a display an image of a card associated with the account; and (b) activating at least one of a magnetic stripe, an electrical interface, and a wireless RF interface to communicate the account information.

In one embodiment, the account identifier may comprise an account number.

In one embodiment, the account identifier maybe a credit account, and the account identifier may comprise a credit account number.

In one embodiment, the authentication information may comprise a biometric from the user.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
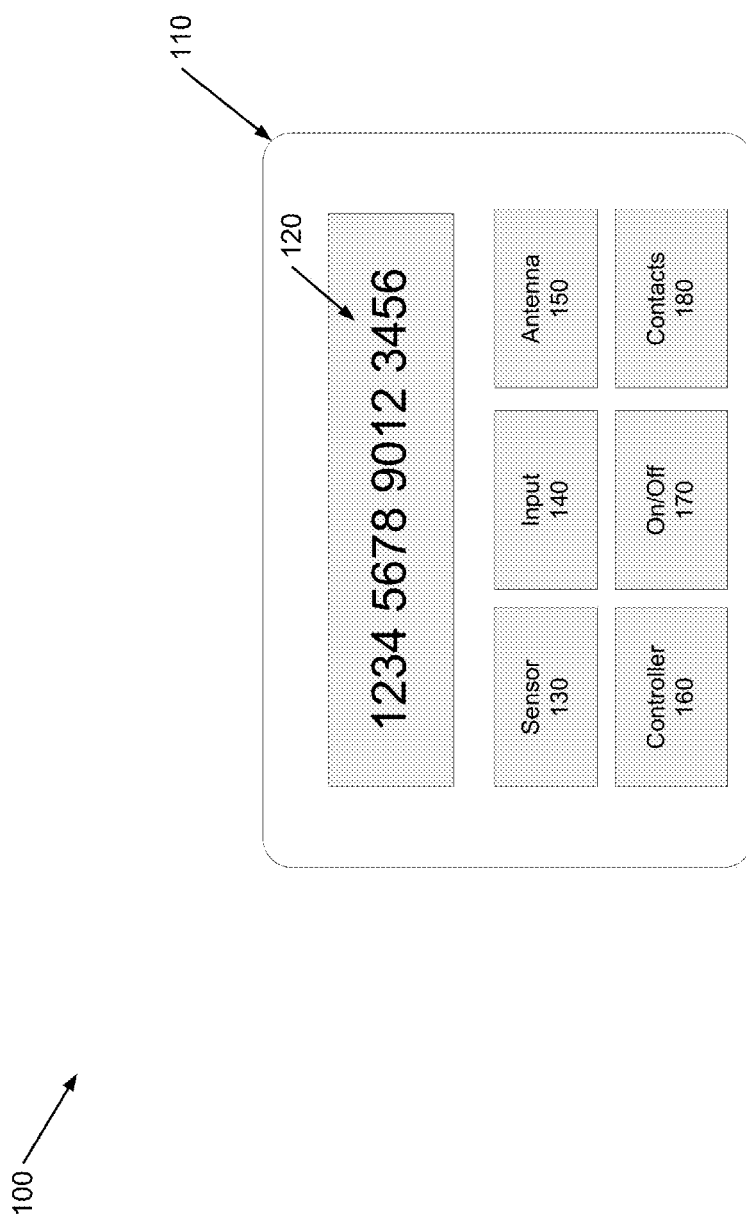
FIG. 1 is a block diagram of a secure transaction card according to one embodiment.
Figure 2:
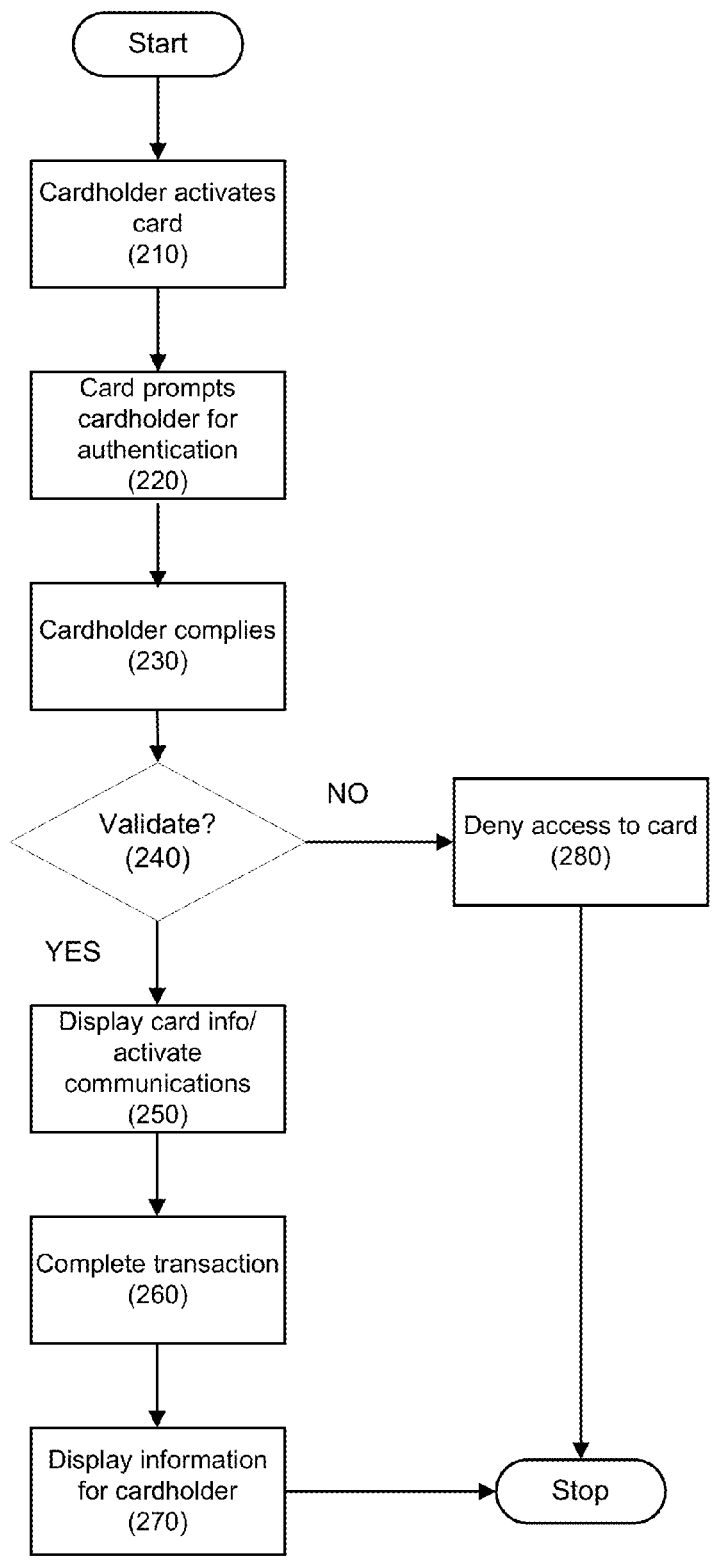
FIG. 2 is a flowchart depicting a method of using a secure transaction card according to one embodiment.
Figure 3:
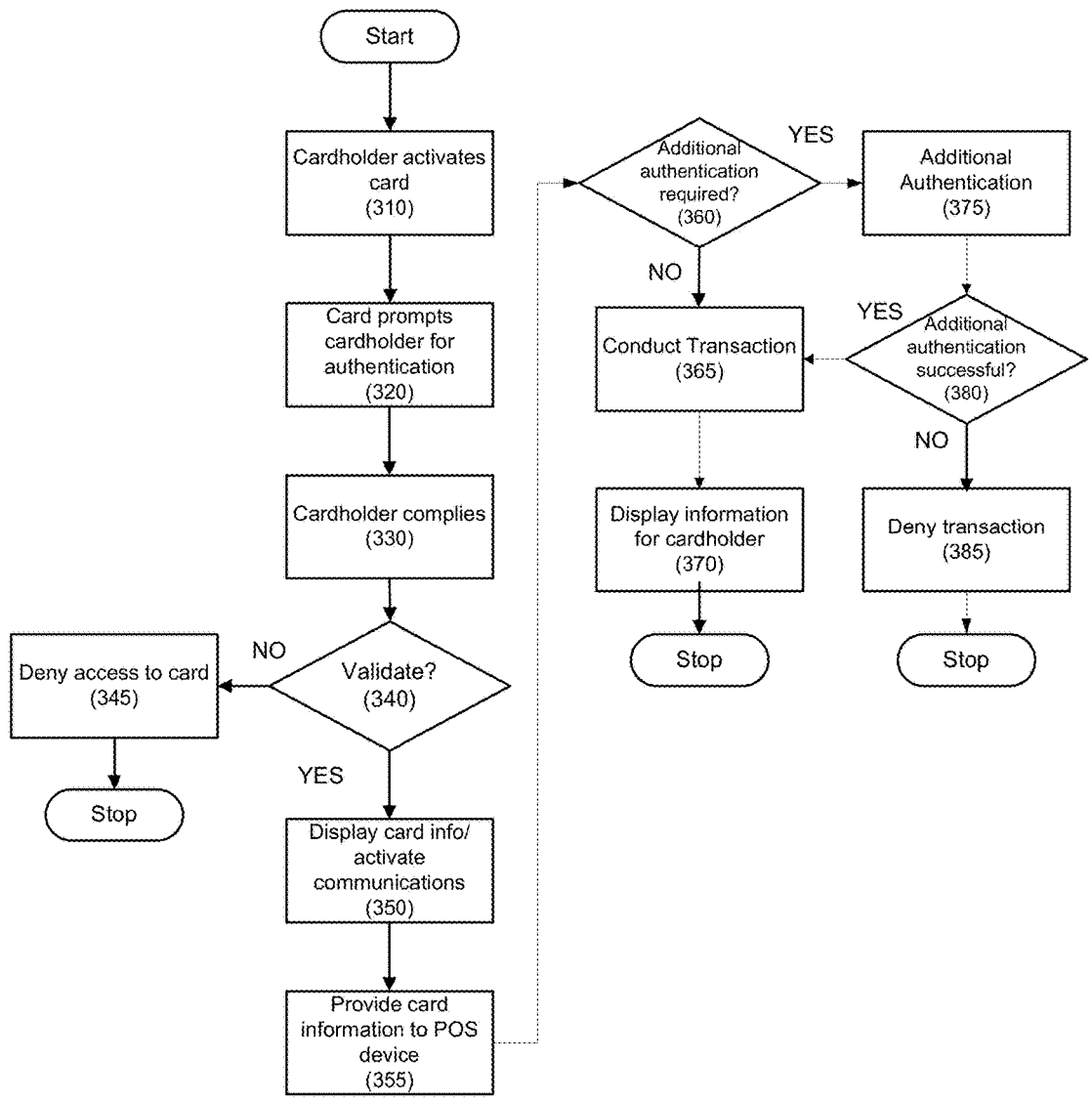
FIG. 3 is a flowchart depicting a method of using a secure transaction card according to one embodiment.

Several embodiments of the present invention and their advantages may be understood by referring to FIGS. 1-3, wherein like reference numerals refer to like elements.

As described herein, systems and methods for secure cards with on-board verification are disclosed. In one embodiment, a secure card may not display some or all of the card information, such as a primary account number, card holder name, etc. until the user authenticated him/herself to the card.

Referring to FIG. 1, secure card 100 includes substrate 110, display 120, and sensor 130. Substrate 110 may be any material that may serve as the structure for secure card 100. In one embodiment, substrate 110 may be a strong, clear material, such as alkali-aluminosilicate sheet glass. An example of such is Corning®'s Gorilla® glass and Lotus™ glass. In another embodiment, substrate 110 may be a neon-based material, a liquid-based material, a crystal-based material, etc. Any suitable clear material may be used as necessary and/or desired.

In another embodiment, substrate 110 may be a non-clear material, including plastics, metals, ceramics, etc. Other suitable materials for substrate 110 may be used as necessary and/or desired.

Secure card 100 may include at least one display 120. In one embodiment, display 120 may be a transparent display, such as a transparent electroluminescent display. An example of such a display is available from Planar Systems, Inc., Hillsboro, Oreg.

In another embodiment, display 120 may be a flexible display. In one embodiment, flexible ePaper displays and e-Ink displays, such as those available from LG Display Co., Ltd. may be used. Other flexible displays may be used as necessary and/or desired.

Any suitable display for displaying information to the user may be used as necessary and/or desired.

Although only one display 120 is illustrated in FIG. 1, it should be recognized that additional displays may be provided as necessary and/or desired. In addition, displays may be provided on the front and back of substrate 110.

In one embodiment, display 120 may be substantially the same size as substrate 110.

In one embodiment, display 120 may be active only when secure card 100 is active and/or when secure card 100 is near a point of sale (POS) device.

Display 120 may display alphanumeric characters, graphics, machine-readable codes (e.g., bar codes, QR codes, etc.), images, video, colors, icons, glyphs, symbols, etc. Any suitable information in any suitable format may be displayed by display 120 as necessary and/or desired.

In one embodiment, display 120 may be used to customize the look and feel of the card. For example, advertisements, marketing information, etc. may be displayed on display 120. In one embodiment, these advertisements, marketing information, etc. may be provided by the issuer of secure card 100. In another embodiment, advertisements, marketing information, etc. may be provided by partners of the issuer of secure card 100. In another embodiment, these advertisements, marketing information, etc. may be provided by merchant(s) in the geographical location of secure card 100. In another embodiment, display 120 may display social media, such as what others are shopping for, feeds and information from preferred merchants, etc.

In one embodiment, the cardholder may customize the information provided on display 120. For example, in one embodiment, the cardholder may set preferences so that every time that secure card 100 is used, account information, such as account balance, remaining credit, minimum payment due date, minimum payment due, etc. may be displayed. In another embodiment, display 120 may display, for example, the most recent five transactions conducted with that account, with the particular secure card, etc. The frequency, type of information displayed, amount of information displayed, etc. may be selected as necessary and/or desired.

In one embodiment, secure card 100 may be used with multiple issuers, providers, etc. For example, secure card 100 may function as a credit card, a debit card, a private label card, an identification card/device, a membership card, a library card, an access card, a transit card, a rewards/loyalty card, etc. In one embodiment, depending on the use of the secure card, display 120 may change to reflect the appearance of the card being used. For example, if secure card 100 is being used as a Visa card, the issuer's logo and the Visa indicator may be displayed. If secure card 100 is being used as a private label card, the private label logo may be displayed. If secure card 100 is being used as a membership card, the membership information, photo identification, etc. may be displayed.

In one embodiment, the type of card that may be active, suggested, defaulted to, etc. may be displayed after the cardholder is properly authenticated. In another embodiment, the cardholder may be able to select a card to be active.

Secure card 100 may further include sensor 130. In one embodiment, sensor 130 may be a sensor that receives biometric information from the cardholder. Examples of such sensors include fingerprint sensors, microphones, air detectors (i.e., for measuring breath parameters), cameras, image capture devices, etc. In another embodiment, sensor 130 may detect and/or receive the cardholder's heart rate, pulse, EKG information, temperature, height, weight, body mass index, thermal energy, DNA, biorhythms, etc. Any suitable sensor for receiving any usable biometric or other attribute of the cardholder may be used as necessary and/or desired.

Secure card 100 may also include input 140. In one embodiment, input 140 may be a touch-sensitive keypad, a touch pad, etc. In one embodiment input 140 may receive a code, such as a PIN, from the cardholder. In another embodiment, input 140 may receive an authorization/authentication pattern, sequence, etc. from the cardholder. In still another embodiment, input 140 may receive a signature from the cardholder. In still another embodiment, input 140 may receive out-of-band authentication sent to the cardholder by, for example, SMS, email, voice, etc. Input 140 may receive any input as necessary and/or desired.

In one embodiment, secure card 100 may be used with more than one cardholder/user, and use the input from sensor 130 and/or input 140 to determine the identification of the cardholder/user. In one embodiment, secure card 100 may personalize itself for the identified cardholder/user.

In one embodiment, secure card 100 may only be used with the cardholder and with authorized users (e.g., family members). The biometrics, identifiers, etc. may be registered for use with secure card 100.

In another embodiment, secure card 100 may be used with any cardholders of the issuer of secure card 100 or other sponsors of card functions (e.g., identification card, transit card, etc.). Once a cardholder is registered, the cardholder may be able to use any secure card 100 to retrieve his or her personal information.

In one embodiment, secure card 100 may present a picture, icon, glyph, symbol, color, etc. selected by a user before or after authentication. In one embodiment, the cardholder may scroll through, cycle through, or otherwise select the picture, icon, glyph, symbol, color, etc. that is associated therewith in order to begin the authentication process.

In another embodiment, secure card 100 may return the cardholder's associated picture, icon, glyph, symbol, color after authentication as feedback that secure device 100 itself is authentic.

In one embodiment, secure card 100 may include a magnetic stripe (not shown). The magnetic stripe may not be active until the cardholder is authenticated. In another embodiment, the magnetic stripe may not be active unless the cardholder is authenticated and/or near a POS device.

In one embodiment, once activated, the magnetic stripe may remain active for a predetermined amount of time and then may be deactivated. In another embodiment, the magnetic stripe may remain active for a certain number of transactions.

In one embodiment, the magnetic stripe may be programmable. An example of such a programmable magnetic stripe is disclosed in U.S. Pat. No. 6,631,849, the disclosure of which is incorporated by reference in its entirety.

Secure card 100 may include controller 160 that may control display 120, sensor 130, input 140, antenna 150 for RF or wireless communications, and the magnetic stripe. Secure card 100 may further include a power source (not shown), such as a battery, solar power cells, thermal energy from the cardholder, etc.

In one embodiment, controller 160 may comprise a processor and/or an integrated circuit (IC), memory, etc. Any device capable of functioning as a controller may be used as necessary and/or desired.

In one embodiment, controller 160 may be positioned near the edges of secure card 100. This may be done to maximize the clear or transparent area of secure card 100.

Secure card 100 may include markings including, for example, the cardholder's name, the identity of the issuer, the identity of the card type (e.g., Visa, MasterCard, American Express), etc. Any markings may be provided as necessary and/or desired.

Other features, including on/off mechanism 170, electrical contacts 180, etc. may be provided as necessary and/or desired.

In another embodiment, secure card 100 may include GPS sensor (not shown) for determining a geolocation of secure card 100. In one embodiment, the cardholder may specify geographical areas in which transactions with secure card 100 should be denied and/or require additional authentication, such as, for example, step-up authentication.

In another embodiment, location may be determined in other manners, such as cellular tower identification/triangulation, WiFi source identification/triangulation, user input, POS/merchant communication etc.

In one embodiment, secure card 100 may include cellular and/or wireless data connectivity. Thus, secure card 100 may be able to communicate with the issuer or other parties. This may be to update card data, active or deactivate the card, update software, perform account/card maintenance, etc. In another embodiment, this may further be to provide, update, or modify advertising, marketing, or other materials/information provided to secure card 100 or displayed by display 120.

In one embodiment, the functionality of secure card 100 may be incorporated into a POS device. In another embodiment, the cardholder may dock, connect, or otherwise connect secure card 100 with a POS device in order to conduct a transaction. In one embodiment, secure card 100 may detect the presence of the POS device, activate itself, and allow the user to communicate with the POS device in any suitable manner.

In one embodiment, a cardholder may be presented with a "loaner" secure card 100 in the event that he or she lost, forgot, etc. his or her secure card. The card may function in the same manner after the cardholder is authenticated.

Referring to FIG. 2, a method for using a secure card with on-board verification is provided.

In step 210, the cardholder activates the secure card. This may be accomplished by using an on/off mechanism, such as a switch, button, etc. In another embodiment, the cardholder may depress a sensor or other input device. In still another embodiment, the cardholder may approach a RF-enabled device, such as a POS device, terminal, turnstile, etc. In still another embodiment, the cardholder could swipe a magnetic stripe of the card, "dip" the card into a card reader, contact electrical contacts for the card with electrical contacts of a terminal, etc. In another embodiment, the secure card may be activated by shaking the card. In still another embodiment, the secure card may be activated by detecting thermal energy of the cardholder (e.g. when the cardholder touches or picks up the card). In still another embodiment, the secure card could be activated by "bumping" or other near field communications. Any suitable mechanism for activating the secure card may be used as necessary and/or desired.

In step 220, the display may prompt the user for authentication. In one embodiment, the display may prompt the cardholder to submit a biometric using a sensor that may be provided on the card. For example, the card may instruct the cardholder to "Place finger on the sensor" or a message that is appropriate for the biometric that is to be collected or detected.

In one embodiment, if a code, PIN, password, etc. is to be collected, the display may instruct the cardholder to "Enter PIN" or "Enter Code" as appropriate.

In step 230, the cardholder may comply with the instructions provided on the display.

In step 240, the secure card may validate the data entered in step 230. This may be performed using a processor, IC, etc. within the card.

In step 250, if the data is validated, the display may display a card number, such as a primary account number, and other data (e.g., expiration date, CVV, etc.) necessary to conduct the transaction. In one embodiment, the display may display account information (e.g., credit limit, balance, etc.). In another embodiment, the display may display multiple cards.

In another embodiment, the display may display an icon, picture of a user, symbol, glyph, etc. instead or in addition to an account number.

In one embodiment, other communication mechanisms, such as the magnetic stripe, electrical contacts, RF antenna, etc. may be activated to conduct the transaction. In one embodiment, the cardholder may determine which, if any, of these communication mechanisms to activate.

In one embodiment, the magnetic stripe data may be programmed or decrypted for use. In one embodiment, the magnetic stripe may be deprogrammed for a certain amount of time (e.g., 30 seconds), number of transactions/swipes (e.g., 1 swipe), etc.

In step 260, the transaction may be completed.

In step 270, the display may display information regarding the transaction for the user. For example, the display may display the amount of the transaction, credit limit information, etc. Other information that may be displayed may include the credit used, credit remaining, date of minimum payment due, amount of minimum payment due, last transaction data, etc. The information displayed may be selected by the issuer, cardholder, etc. In one embodiment, the information may be graphically represented (e.g., bar graph, thermometer, etc.) as necessary and/or desired.

In one embodiment, the display may provide other metrics, such as monthly spending versus budget, etc. In one embodiment, the display may provide information regarding any rewards or loyalty points earned. In one embodiment, the user could also be provided as an out-of-band message, such as a text message, an email message, a voice message, etc.

If, in step 240, the data is not validated, access to the card may be denied in step 280. In one embodiment, the cardholder may be given a limited number of attempts until the card is locked. In one embodiment, the card may automatically be erased if the cardholder fails to provide validated data. In another embodiment, the data may appear to be authorized, but the card may cause an alert to be sent to the authorities.

In one embodiment, if the data is not validated, the secure card may record the data, such as a biometric, and provide that data to the authorities. In another embodiment, the secure card may take a picture of the user, and/or may communicate with a camera in a point of sale device, at a merchant location, etc. to take a picture and/or record a video of the user.

In another embodiment, the secure card may "self-destruct" by, for example, erasing its contents and rendering itself at least partially unusable, if the data is not validated.

In another embodiment, the secure card may make a noise, emit a shock, etc., if the data is not validated.

In one embodiment, additional verification may be required for transactions. For example, inherently risky transactions, such as high dollar items, foreign transactions, etc. may require additional verification. In another embodiment, transactions that may invoke fraud warnings may require additional verification. And, in still another embodiment, transactions that are abnormal for the cardholder—for example, transactions that are inconsistent with a cardholder's purchase history, spending patterns, location, etc. may require additional verification.

In one embodiment, the cardholder may set a "whitelist" of merchants, geographical areas, dates of card use, times of card use, etc. with which transactions may be exempt from additional verification. In another embodiment, the cardholder may set a "blacklist" of merchants, geographical areas, dates of card use, times of card use, etc. with which transactions should be denied and/or require additional verification even if they do not meet other standards for additional verification.

In one embodiment, the additional information may be provided to the cardholder in a separate transmission, such as to a registered mobile device (e.g., by text message, voice, email, etc.).

In another embodiment, the additional information may be the submission of a code, PIN, additional biometric, etc.

The number and type of transactions that require additional authentication may consider user inconvenience and risk factors. Moreover, the additional authentication may be local (i.e., by card) or may be done in conjunction with the issuer over a network.

In one embodiment, the type of additional information requested (e.g., code from a separate communication, additional biometric, PIN, password, etc.) may be selected randomly, may rotate, may be selected based on the dollar value of the transaction, may be based on the location of the transaction and/or the secure card, may be based on the merchant/vendor, may be based on the types of goods/services purchased, may be based on spending patterns/habits, etc.

In one embodiment, different levels of authentication and/or verification may be required for different types of cards. For example, the verification required for a personal card may be different from that required for a corporate card.

In one embodiment, the cardholder may designate subordinate accounts that may also be used with the same secure card. For example, a cardholder may designate a subordinate card for his child. The transaction may be conducted using the same account number as the primary account number, but may be subject to restrictions, such as certain merchant category codes, spending limits, geographical restrictions, etc.

Referring to FIG. 3, a method for using a secure card with on-board verification and additional authentication is provided.

Steps 310-350 may be similar to steps 210-250, described above. Note that step 345 may be similar to step 280, above.

In step 355, the card may provide card information to a POS device, terminal, etc. In one embodiment, the card information may be provided to an on-line retailer.

In step 360, the transaction authorizer, such as the issuer of the card, may determine if additional authentication is required. If, no additional authorization is required, the transaction may be conducted in step 365, and additional information may be displayed in step 370, which may be similar to step 270, above.

If additional authentication is required, in step 375, additional authentication information may be provided and/or requested.

In one embodiment, the transaction authorizer may provide an out-of-band message (e.g., a text message, email, voice message, etc.) to a registered device of a cardholder. The transaction authorizer may request that the cardholder provide, for example, a code in that message, to the secure card.

In another embodiment, the transaction authorizer may request that the cardholder provide a second biometric. In one embodiment, the request may be displayed on the secure card.

In another embodiment, the transaction authorizer may request that the cardholder provide a PIN, password, etc. In one embodiment, the request may be displayed on the secure card.

In step 380, if the additional authentication is successful, the transaction may be conducted in step 365 as described above.

If the additional authentication is not successful, the transaction may be denied in step 385.

In one embodiment, the secure card may pre-select a card for the user based on information received from a POS device, terminal, reader, etc. For example, after a secure card is powered on, activated, or even when the display is not active, the secure card may determine the type of merchant, terminal, reader, etc. that it may be used with. In one embodiment, it may receive information from a POS device. In another embodiment, it may use GPS, WiFi or cellular triangulation, etc. to determine its location. It may further determine an identity of a potential merchant based on this information.

The controller may then select a recommended account to display to conduct a transaction, or it may select a recommended identification card to display. For example, the controller may select the account with the greatest rewards points, lowest interest rate, etc. and display that for the user. As another example, if the controller determines that it is a public library, it may display the cardholder's library card. The controller may present an option to the cardholder to use one or more reward/loyalty points, coupons (e.g., Groupons), if available, to conduct the transaction.

In one embodiment, the cardholder may set default accounts to display. In another embodiment, the cardholder may set locations for using those accounts.

Examples card selection are disclosed in U.S. Pat. Nos. 7,413,113 and 7,644,859, the disclosures of which are incorporated, by reference, in their entireties.

In one embodiment, the account number for the secure card may be periodically changed without replacing the card. For example, every other year, the issuer may change the card number and provide this information to the card. When a charge is made with the new account number, the user may be informed of the new number.

In one embodiment, the issuer (or account provider) may push a new account number and/or certificate to the secure card. In another embodiment, the issuer (or account provider) may push an algorithm to the secure card, and the integrated circuit may execute the algorithm to generate an account number.

Any suitable period for changing the account number may be used as necessary and/or desired.

In one embodiment, a card number may be provided for recurring charges with a single merchant. For example, a cardholder may request a card number to be used with a certain merchant. If charges are received from a merchant other than the designated merchant, the charges will be declined, and the card will be considered to have been compromised.

In one embodiment, a user may request a one-time use account number for use in certain transactions. For example, if the user is conducting a transaction with a merchant with which he or she does not want to share the account number, the user may request and have displayed a number that may be used for one transaction. Following completion of the transaction, the account number may no longer be available for use.

In one embodiment, the account number may be a "synthetic value" rather than a card number. In another embodiment, it may be an encrypted value. In still another embodiment, it may be a scrambled value. In still another embodiment, it may be a tokenized value based on a random number generator. Any other sort of suitable account number may be used as necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

I claim:

1. A method of using a transaction device, comprising:
    a transaction device receiving first authentication information from a user;
    retrieving, from a memory of the transaction device, stored authentication information for the user;
    at least one computer processor of the transaction device verifying the authenticity of the user by comparing the first authentication information with the stored authentication information;
    the transaction device receiving, from a point of sale device, transaction data;
    the at least one computer processor determining that additional user authentication is necessary based on the transaction data;
    displaying on the display a request for second authentication information from the user;
    receiving the second authentication information from the user; and
    the at least one computer processor verifying the second authentication information; and
    after the first and second authentication information are verified, activating at least one of the magnetic stripe, the electrical interface, and the wireless RF interface to communicate the account information.

2. The method of claim 1, wherein the account identifier comprises an account number.

3. The method of claim 2, further comprising:
    receiving, from a point of sale device, transaction data;
    communicating, to an approval authority, the transaction data;
    receiving, from the approval authority, a requirement for additional authentication;
    displaying on the display a request for second authentication information from the user;
    receiving the second authentication information from the user; and
    the computer processor verifying the second authentication information.

4. The method of claim 3, further comprising:
    communicating the authentication information to a third party if the authentication information does not match the stored authentication information.

5. The method of claim 3, further comprising:
    recording an image or video of the user if the authentication information does not match the stored authentication information.

6. The method of claim 3, further comprising:
    transmitting, to a point of sale device, a request to record an image or video of the user if the authentication information does not match the stored authentication information.

7. The method of claim 3, further comprising:
    disabling the transaction device if the authentication information does not match the stored authentication information.

8. The method of claim 1, wherein the account is a credit account, and the account identifier comprises a credit account number.

9. The method of claim 1, wherein the authentication information comprises a biometric from the user.

10. The method of claim 1, wherein an account identifier for a transaction account associated with the user is displayed on the display after the first and second authentication information are verified.

* * * * *